(12) United States Patent
Wang et al.

(10) Patent No.: US 6,871,136 B1
(45) Date of Patent: Mar. 22, 2005

(54) METHOD FOR ON-BOARD DIAGNOSIS OF COLD START EMISSIONS REDUCTION CONTROL STRATEGY

(75) Inventors: Wenbo Wang, Novi, MI (US); Richard B. Jess, Haslett, MI (US); Lyle E. Hamilton, Howell, MI (US); Daniel G. Bolstrum, West Bloomfield, MI (US); Matthew J. Roelle, Menlo Park, CA (US); John F. Van Gilder, Webberville, MI (US); David N. Belton, Birmingham, MI (US); Richard W. Amann, Bloomfield Hills, MI (US); Fang-Cheng J. Fu, Brighton, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/772,872

(22) Filed: Feb. 5, 2004

(51) Int. Cl.[7] .............................................. G01M 15/00
(52) U.S. Cl. ...................................................... 701/114
(58) Field of Search ......................................... 701/114

(56) References Cited

U.S. PATENT DOCUMENTS 4,393,696 A * 7/1983 Willis et al. ............... 73/117.3

* cited by examiner

Primary Examiner—Andrew M. Dolinar
(74) Attorney, Agent, or Firm—Christopher DeVries

(57) ABSTRACT

A method and control system for verifying cold start emissions reduction control in a vehicle using an internal combustion engine utilizes measured engine speed and commanded ignition timing to calculate an estimated actual engine-out thermal energy flow. An expected thermal energy flow is calculated based on designed engine speed and ignition timing. A residual energy flow is calculated based on a difference between the estimated actual thermal energy flow and the expected thermal energy flow. Meanwhile, a system quality-weighting factor is calculated based on several measured engine parameters. A qualified energy flow residual is calculated based on the system quality weight and the residual energy flow. The qualified energy residual flow is accumulated, averaged based on the accumulated quality weight, and then filtered. Diagnostic control determines that if the cold start emissions reduction control is operating correctly based on the filtered averaged qualified energy flow residual comparing a predetermined range.

18 Claims, 5 Drawing Sheets

METHOD FOR ON-BOARD DIAGNOSIS OF COLD START EMISSIONS REDUCTION CONTROL STRATEGY

FIELD OF THE INVENTION

The present invention relates to engine control systems for vehicles, and more particularly to a diagnostic for monitoring a cold start emissions reduction control system.

BACKGROUND OF THE INVENTION

Catalytic converters reduce exhaust gas emissions in vehicles using an internal combustion engine. A three-way catalytic converter includes a substrate with a coating of catalyst materials that stimulate the oxidation of hydrocarbon and carbon monoxide, and the reduction of nitrogen oxides, in the exhaust gas. The catalysts operate optimally when the temperature of the catalysts is above a minimum level and when the air/fuel ratio is stoichiometric. Stoichiometry is defined as an ideal air/fuel ratio, which is 14.7 to 1 for gasoline.

It is desirable to optimize the air/fuel ratio in the engine for performance as well as emissions control. Emissions control is increasingly difficult at startup because the catalysts have not reached the warmed-up operating temperature. There are numerous factors that affect cold start emissions but they may be summarized in two major categories. The first is engine-out emissions and the second is catalyst efficiency. Engine-out emissions are primarily dependant on base engine design, production and function of the engine control system. Catalyst efficiency is directly related to converter temperature for a given converter as designed. Catalyst light-off is defined as true when the emission conversion efficiency exceeds 50%.

One way to speed up catalyst converter warm-up or shorten its light-off time at an engine cold start is to generate high engine-out energy. The energy is mainly dependent on exhaust temperature and mass flow rate while the exhaust gas specific heat capacity does not vary much. Retarding ignition timing and increasing engine idle speed are known engine control methods to reduce cold start emissions. On-board diagnostics version 2 (OBDII) regulations require cold start emissions reduction control strategies to be monitored and that the target conditions necessary to reduce emissions or catalyst light-off time are achieved and emissions do not exceed 1.5 times the applicable FTP (Federal Test Procedures) standards.

SUMMARY OF THE INVENTION

A method and control system for verifying cold start emissions reduction control in a vehicle using an internal combustion engine utilizes measured engine speed or RPM (Revolutions per Minute) and commanded ignition timing. An actual thermal mass flow is estimated based on the measured engine speed. An actual thermal energy potential per unit mass is estimated from the commanded ignition timing. An estimated actual thermal energy is calculated by calculating a product of the actual thermal mass flow and the thermal energy potential.

In other features, an expected thermal energy is calculated by determining a designed thermal mass flow based on a designed engine speed, determining a designed thermal energy potential per unit mass based on designed ignition timing and calculating a product of the designed thermal mass flow and the designed thermal energy potential.

According to yet other features, an energy residual is determined by calculating a difference between the estimated actual thermal energy and the expected thermal energy. At the same time, a quality-weighting factor is calculated based on measured engine parameters. The energy residual is qualified, accumulated, averaged, filtered, and then compared with a predetermined metric to make a pass or fail decision.

A method and control system for verifying cold start emissions reduction control in an internal combustion engine calculates a quality weight based on measured engine parameters. An expected thermal energy is calculated based on designed engine parameters. An estimated actual thermal energy is calculated based on measured engine speed and commanded spark timing. A residual energy is calculated based on a difference between the estimated actual thermal energy and the expected thermal energy. A qualified energy residual is calculated based on the quality weight and the residual energy. The qualified energy residual is accumulated, averaged and then filtered. Diagnostic control determines if the cold start emissions reduction control is operating correctly based on the filtered averaged qualified energy residual satisfying a predetermined range.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment is merely exemplary in nature and is in no way intended to limit the invention, its application, or uses.

Figure 1:
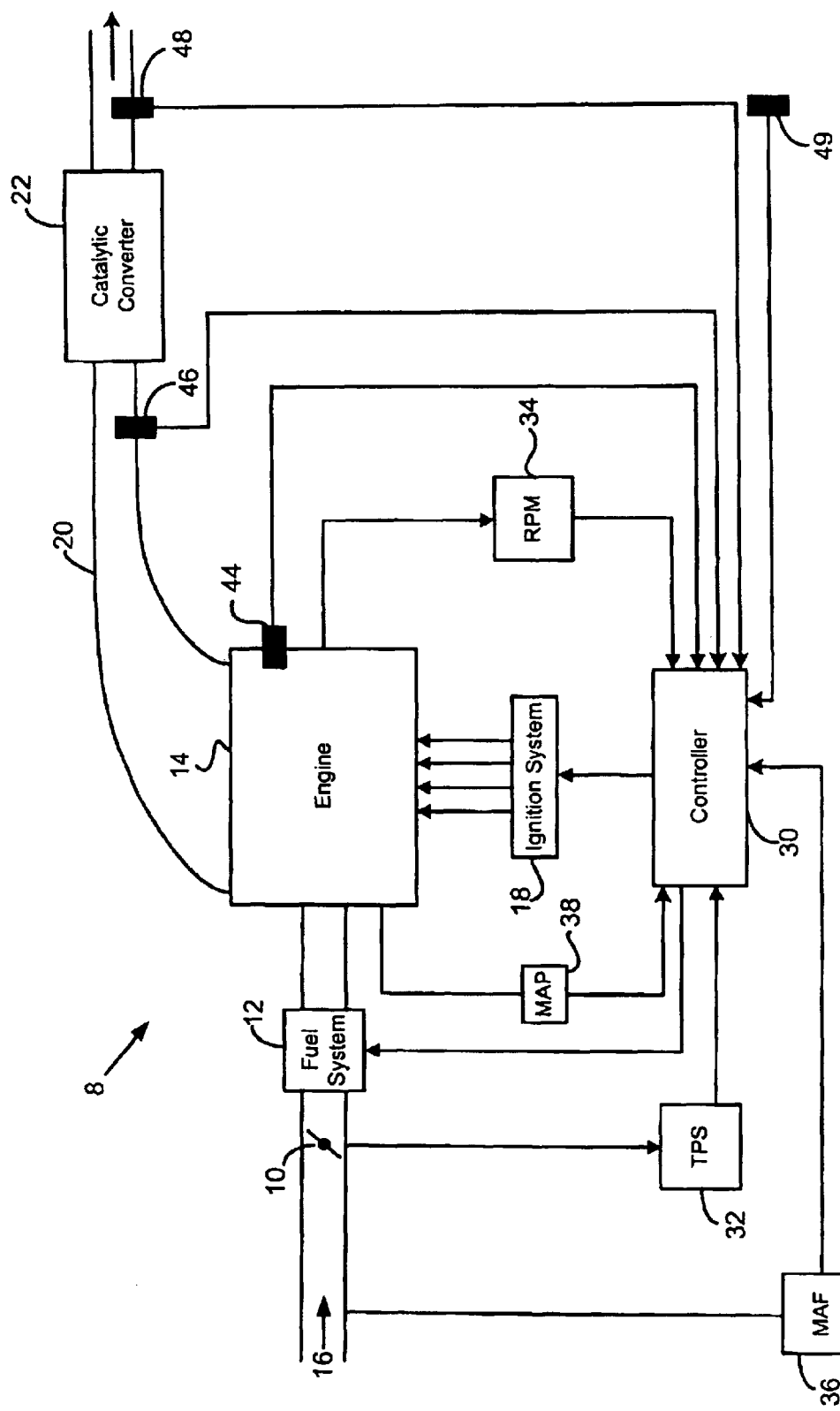
FIG. 1 is a functional block diagram of an engine control system according to the present invention for a vehicle.

Referring to FIG. 1, an exemplary engine control system 8 is shown. A throttle 10 and a fuel system 12 control the air/fuel mixture that is delivered to an engine 14 through an intake 16. An ignition system 18 ignites the air/fuel mixture in the engine 14. Exhaust gas that is created by the combustion of the air/fuel mixture is expelled through an exhaust manifold 20. A catalytic converter 22 receives the exhaust gas from the exhaust manifold 20 and reduces the emissions levels of the exhaust gas.

A controller 30 communicates with various components of the engine control system 8, including but not limited to a throttle position sensor 32 (TPS), the fuel system 12, the ignition system 18, a mass airflow sensor 36 (MAF) and an intake manifold air pressure sensor 38 (MAP). The controller 30 receives a throttle position signal from the TPS 32, a mass airflow signal from the MAF 36 and an intake manifold air pressure signal from the MAP 38. The throttle position signal, the mass airflow signal and the manifold air pressure signal are used to determine air flow into the engine 14. The air flow data is then used to calculate the corresponding fuel to be delivered by the fuel system 12 to the engine 14. The controller 30 further communicates with the ignition system 18 to determine ignition spark timing. Oxygen sensors 46 and 48 are disposed in the exhaust 20 upstream and downstream, respectively, of the catalytic converter 22. The oxygen sensors 46 and 48 output signals to the controller 30 that represent the oxygen content before and after the catalytic converter 22 in the exhaust 20.

The controller 30 may receive additional feedback from other components in the engine control system 8, including but not limited to coolant temperature from a coolant temperature sensor 44 and engine speed from an engine speed sensor 34 (RPM). The controller 30 may also receive other signals outside the engine control system 8, including but not limited to a vehicle speed signal from a vehicle speed sensor 49. These and other variables may affect the overall performance and behavior of the engine control system 8. The controller 30 utilizes data gathered from the various engine components to monitor and optimize engine performance.

In the present invention, a diagnostic control system is implemented to monitor the cold start emissions reduction control strategy. The diagnostic control system utilizes engine speed and ignition timing to correlate an engine-out energy flow. Engine-out energy flow ($\dot{E}$) is represented by the following mathematical relationship as a function of engine speed and ignition timing. Energy flow is designated as a unit of Watts or Joules (J) per second (s). The mass unit is represented in Grams (g). The function relation is represented in f.

$$\dot{E} = f(\text{engine speed}) * f(\text{ignition timing}) = (g/s) * (J/g) = J/s$$

Ignition timing directly relates to an engine-out gas temperature for a given operating condition, and is correlated to thermal energy potential per unit mass. The engine speed is correlated to the engine-out thermal mass flow. $\dot{E}$ is calculated for an actual engine-out energy ($\dot{E}_{Actual}$) and for an expected engine-out energy ($\dot{E}_{Expected}$). $\dot{E}_{Actual}$ is estimated based on measured engine speed and commanded ignition timing. $\dot{E}_{Expected}$ is determined based on designed engine speed and ignition timing calibrations. Control calculates a difference between the $\dot{E}_{Actual}$ and the $\dot{E}_{Expected}$ to determine an energy residual ($\dot{E}_{Residual}$). The $\dot{E}_{Residual}$ is then qualified based on predetermined operating conditions. An $\dot{E}_{Residual}$ is calculated at each sample event or time loop over a range of engine run operation time such as from 0 to 20 seconds at a cold startup.

Control determines whether each $\dot{E}_{Residual}$ is qualified to use for diagnostic based on a number of operating conditions. The quality measurement verifies operating conditions are within acceptable ranges. If an operating condition is not within its acceptable range, the quality measurement will result in a quality weight of zero and an unqualified energy residual. The operating conditions may include but are not limited to vehicle speed, throttle position, engine coolant temperature and engine run time. The first two are used to make sure the engine 14 runs at idle or light load at or close to steady state conditions. The last two are used to make sure the engine 14 starts and runs at cold start conditions. When the control strategy is active during startup, the acceptable ranges of these operating conditions are checked. For example, an acceptable range of vehicle speed includes a maximum threshold such as less than 1.0 MPH (miles per hour). An acceptable range of throttle position includes a closed throttle position required for an effective engine idle operation. An acceptable engine coolant temperature includes a range comparable to ambient and that is consistent with cold startup conditions. An acceptable engine run time includes a timeframe consistent with cold start. For example the timeframe may be from engine running to 20 seconds. It is appreciated that control may be configured to reference fewer or additional operating conditions.

According to the present invention, control assigns a weight (1) to an operating condition well satisfying a respective range and a weight (0) to an operating condition falling outside the respective range. A weight between 1 and 0 is possible depending on how well an operating condition satisfies a predetermined respective range or scale. The system quality measurement is a product of each weight for a sampling event or per activation of a time loop. In this way, if a single weight is (0), the quality measurement for that time will be (0). An $\dot{E}_{Residuals}$ is qualified by calculating a product of each $\dot{E}_{Residual}$ and system quality measurement weight for a sampling event or per activation of a time loop. Both the qualified $\dot{E}_{Residuals}$ and the system quality weights are then accumulated over the operating time.

When the accumulated system quality weight is sufficient or more than a calibration to make a robust test, the average engine-out energy flow can be determined from the accumulated qualified energy residual divided by the accumulated quality weight. The result is filtered and compared to a predetermined desired range. If the result is outside the predetermined range, a fault signal is generated indicating the emissions reduction control malfunction. Otherwise, a pass signal is reported to diagnostic control indicating the emissions reduction control is functioning properly.

Figure 2:
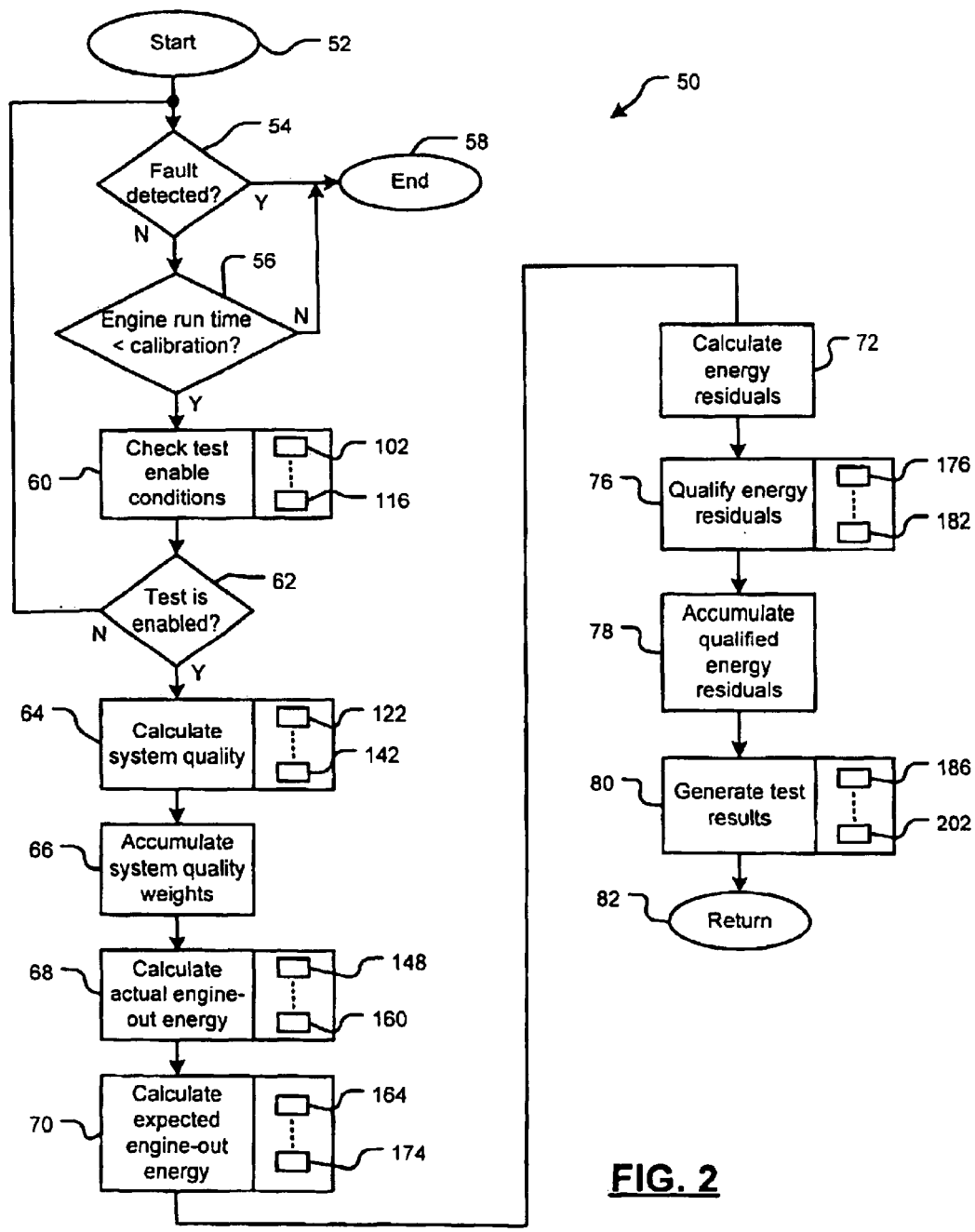
FIG. 2 is a flow diagram illustrating steps for verifying cold start emissions reduction control according to the present invention.

With reference to FIG. 2, steps for verifying the cold start emissions reduction control in an internal combustion engine are shown generally at 50. Control begins with step 52. In step 54, control determines whether any applicable active diagnostic faults are detected. The applicable active faults are those that will prevent this diagnosis from making a correct or robust detection, and may include but are not limited to MAF sensor fault, intake rationality fault, TPS fault, idle speed control faults, fuel injection fault, spark coil fault, and engine misfire faults, etc. It is appreciated that other fault signals may be considered. If any applicable active faults are detected, diagnostic control ends in step 58.

If no applicable active faults are detected, control determines whether the engine run time is within a calibration in step 56. A run time calibration is preferably consistent with startup time as, described herein. If the engine run time is not within the calibration, control ends in step 58. If the engine run time is within the calibration, system enable conditions are tested in step 60. If test is enabled in step 62, control goes to step 64. If test is disabled, control will return and start from beginning at next time loop. In step 64, a system quality (Q) weighting factor is calculated. In step 66, the quality weights are accumulated. In step 68, the actual engine-out energy is calculated. In step 70, the expected engine-out energy is calculated. In step 72, the energy residuals $\dot{E}_{Residuals}$ are calculated. In step 76, the energy residuals are qualified. In step 78, the qualified energy residuals are accumulated. In step 80, test results are generated only if control believes sufficient data has been collected. Diagnostic control returns in step 82.

Figure 3:
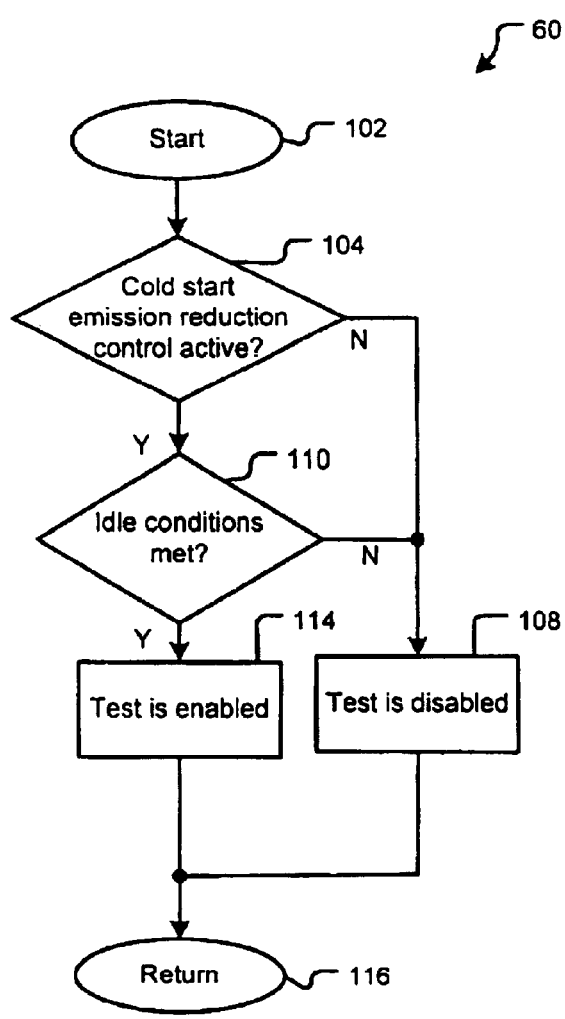
FIG. 3 is a flow diagram illustrating steps for checking enable conditions of FIG. 2.

With continued reference to FIG. 2 and further reference to FIG. 3 step 60 will be described in greater detail. The, check conditions routine 60 begins in step 102. In step 104, diagnostic control determines whether cold start emissions reduction control strategy is active. If either the cold start idle speed control or cold start spark control is active, the cold start emissions reduction control strategy is active. If the cold start emissions reduction control strategy is not active, test disabled flag is set in step 108 and control returns in step 116. If the cold start emissions reduction control strategy is active, control determines whether idle conditions are met in step 110. If idle conditions are not met, test disabled flag is set in step 108 and diagnostic control returns in step 116. If idle conditions are met, test enabled flag is set and diagnostic control returns in step 116.

Figure 4:
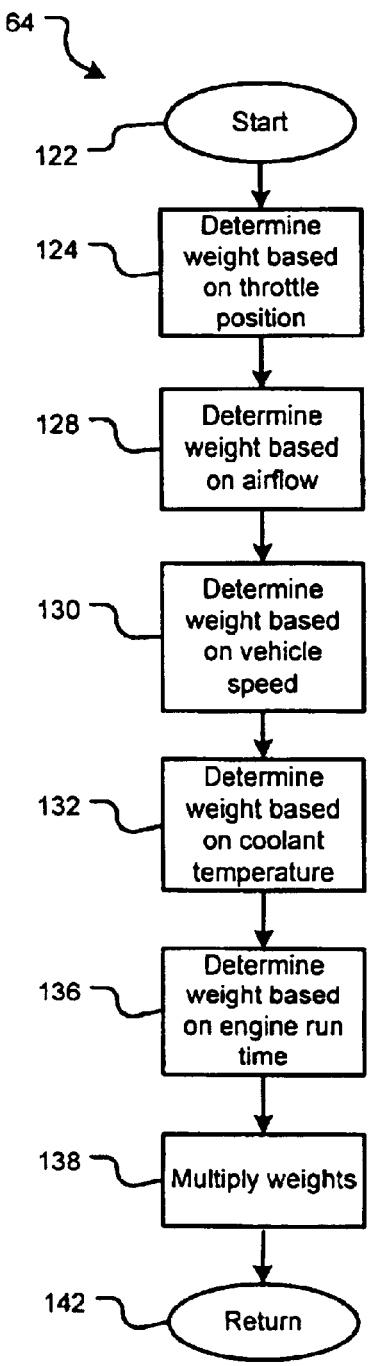
FIG. 4 is a flow diagram illustrating steps for calculating quality of a sample of operating conditions of FIG. 2.

Turning now to FIG. 4, the quality calculation routine 64 will be described in greater detail. As previously described, a weight is established for a plurality of operating conditions. If an identified operating condition is well satisfied, a weight of (1) is assigned. If an identified operating condition is not satisfied, a weight of (0) is assigned. A weight between 1 and 0 is possible depending on how well an applicable operating condition is satisfied. The operating conditions described with respect to steps 124 to 138 are exemplary and may contain other conditions as desired. The ranges of satisfactory operating conditions are consistent with measurements typical at engine startup and idle. The quality routine 64 begins in step 122. In step 124, a weight is determined based on a measurement communicated by the throttle position sensor (TPS) 32. In step 128, a weight is determined based on an airflow measurement communicated, but not limited to, by the mass airflow sensor (MAF) 36 and the intake manifold air pressure sensor (MAP) 38. In step 130, a weight is determined based on a vehicle speed measurement. In step 132, a weight is determined based on a coolant temperature measurement communicated by coolant temperature sensor 44. In step 136 a weight is determined based on the engine run time. In step 138, the product of the weights is calculated for the system quality weight. Diagnostic control returns in step 142.

Figures 5, 6:
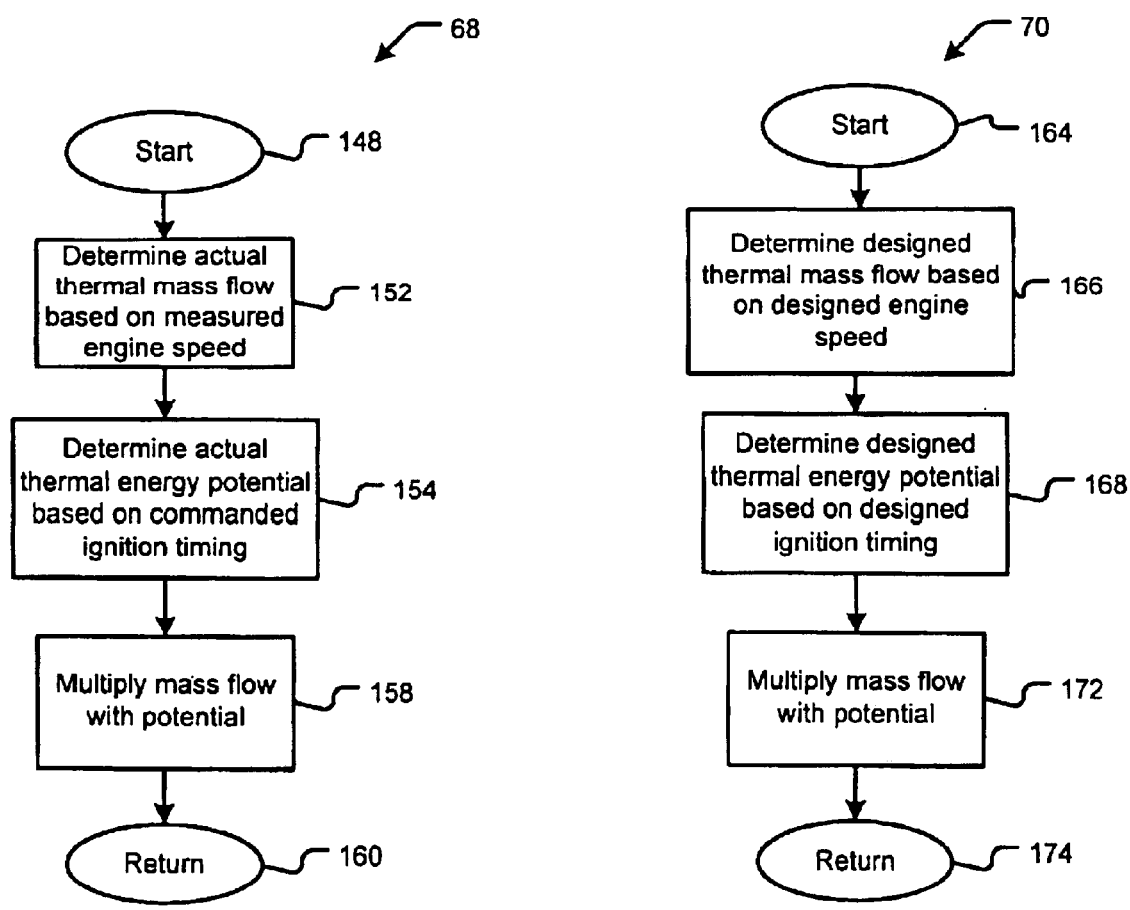
FIG. 5 is a flow diagram illustrating steps for calculating an actual engine-out energy of FIG. 2.
FIG. 6 is a flow diagram illustrating steps for calculating an expected engine-out energy of FIG. 2.

With reference to FIG. 5, the actual engine-out energy calculation routine 68 will be described in greater detail. The actual energy routine 68 begins in step 148. In step 152, an actual thermal mass flow is determined based on an engine speed measured by the engine speed sensor 34. A measured engine speed is preferably correlated to an actual thermal mass flow through a lookup table. In step 154, an actual thermal energy potential is determined based on a commanded ignition timing communicated between the controller 30 and the ignition system 18. A commanded ignition timing is preferably correlated to an actual thermal energy potential per unit mass through a lookup table. In step 158, the actual engine out energy ($\dot{E}_{Actual}$) is determined by calculating the product of the actual thermal mass flow and the actual thermal energy potential per unit mass. Diagnostic control returns in step 160.

With reference to FIG. 6, the expected engine-out energy calculation routine 70 will be described in greater detail. The expected energy routine 70 begins in step 164. In step 166, an expected thermal mass flow is determined based on a designed engine speed. A designed engine speed is preferably correlated to an expected thermal mass flow through a lookup table. In step 168, an expected thermal energy potential per unit mass is determined based on designed ignition timing. A designed ignition timing is preferably correlated to an expected thermal energy potential through a lookup table. In step 172, the expected engine-out energy ($\dot{E}_{Expected}$) is determined by calculating the product of the expected thermal mass flow and the expected thermal energy potential per unit mass. Diagnostic control returns in step 174.

Figure 7:
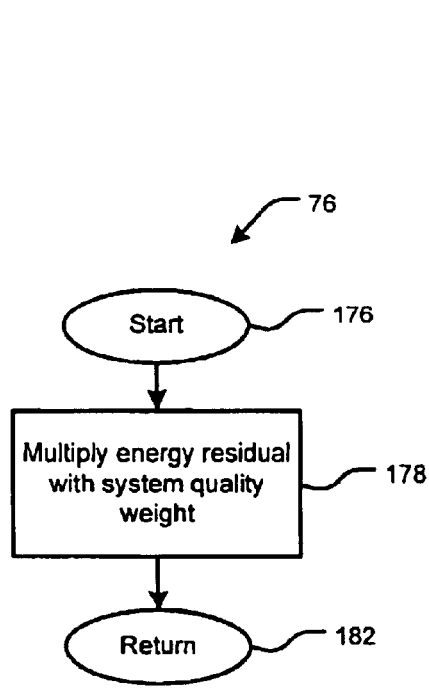
FIG. 7 is a flow diagram illustrating steps for qualifying energy residuals of FIG. 2.
Figure 8:
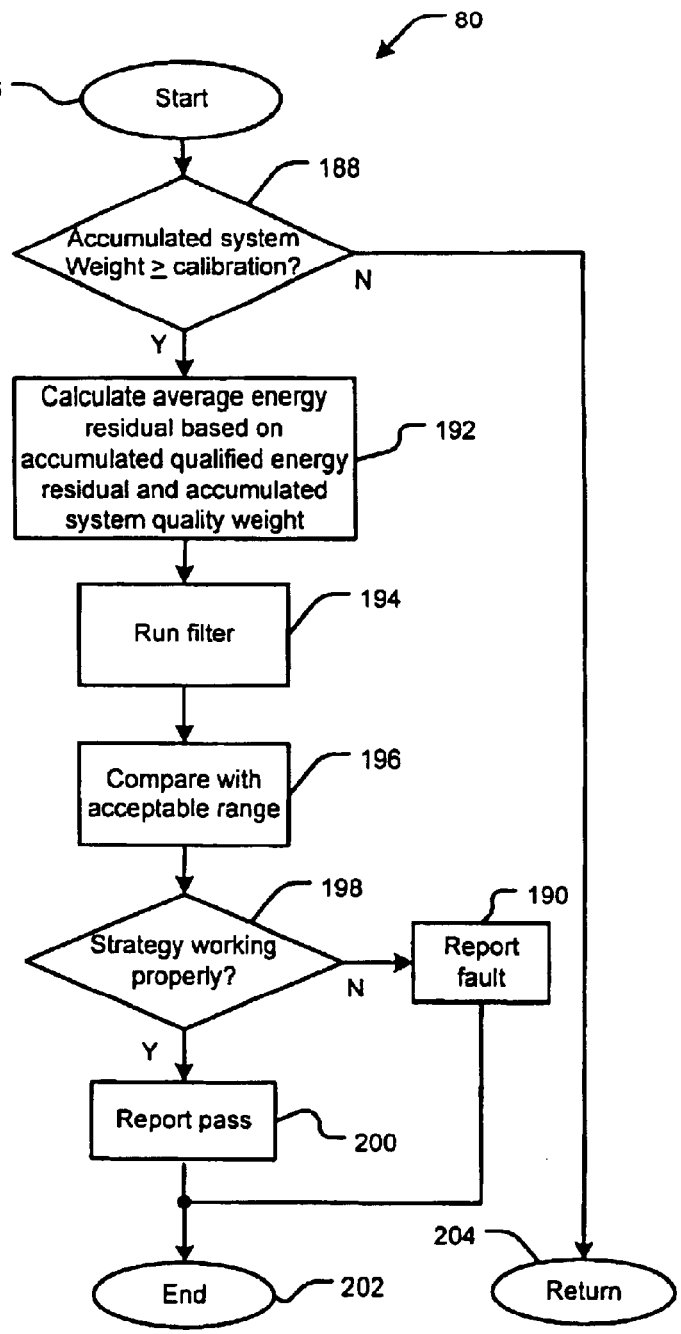
FIG. 8 is a flow diagram illustrating steps for generating test results for diagnosis of the cold start emissions reduction control of FIG. 2.

With reference now to FIG. 7, the energy residual qualification routine 76 will be described. The qualification routine 76 begins in step 176. In step 178, the energy residuals ($\dot{E}_{Residual}$) are qualified by calculating a product of each $\dot{E}_{Residual}$ and quality measurement (Q). Diagnostic control returns in step 182.

Once the qualified energy residuals are accumulated in step 78, a generate test results routine is activated in step 80. The test result routine 80 beings in step 186. In step 188, control determines whether the accumulated quality weight is greater than or equal to a predetermined calibration. If the weight is less than the predetermined calibration, no test results or diagnostic decisions are made and diagnostic control returns in step 204. If the weight is equal to or more than the predetermined calibration, the average engine-out energy flow ($\dot{E}_{Avg}$) is calculated in step 192 from the accumulated qualified energy residual divided by the accumulated quality weight. In step 194, the average engine-out energy flow ($\dot{E}_{Avg}$) is run through a filter such as an exponentially weighted moving average (EWMA) filter. In step 196 the result is compared with a predetermined acceptable range. In step 198, control determines whether the cold start emissions control is operating properly based on the comparison in step 196. If control determines that the emissions reduction control is not working properly, a fault signal is generated in step 190 and control ends in step 202. If control determines that emissions control is operating correctly, a pass signal is generated in step 200 and diagnostic control ends in step 202.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A method of verifying cold start emissions reduction control in an internal combustion engine, comprising:

measuring engine speed;

determining a commanded ignition timing of said engine;

determining an actual energy flow based on said measured engine speed and said commanded ignition timing;

determining an energy flow residual based on said actual energy flow and an expected energy flow;

assigning a system quality weight to said energy residual based on predetermined operating conditions;

accumulating a plurality of said weighted energy residuals over a predetermined time;

determining an average engine-out energy flow based on said accumulated weighted energy residual and accumulated system quality weight;

filtering said average engine-out energy flow;
comparing said filtered average engine-out energy flow with a predetermined acceptable range; and
generating a signal based on said comparison.

2. The method of claim 1 wherein determining an actual energy flow comprises:
determining an actual thermal energy potential per unit mass based on said commanded ignition timing;
determining an actual thermal mass flow based on said measured engine speed; and
calculating a product of said actual thermal energy potential and said thermal mass flow.

3. The method of claim 2 further comprising:
calculating an expected energy flow by:
determining a designed thermal mass flow based on a designed engine speed;
determining a designed thermal energy potential based on designed ignition timing; and
calculating a product of said designed thermal mass flow and said designed thermal energy potential.

4. The method of claim 1 wherein determining an energy flow residual comprises:
calculating a difference between said actual energy flow and said expected energy flow.

5. The method of claim 1 wherein assigning a weight comprises:
determining if a throttle position is within a predetermined range;
determining if an intake mass airflow is within a predetermined range;
determining if a vehicle speed is within a predetermined range;
determining if a coolant temperature is within a predetermined range; determining if said engine is running within a predetermined run time; and
calculating the product of all weights defining a system quality weight based on said determinations.

6. The method of claim 1 wherein determining an average engine-out energy flow comprises:
assigning a system quality weight to said energy flow residual based on predetermined operating conditions;
accumulating a plurality of said system quality weights over a predetermined time;
accumulating a plurality of said weighted energy residuals over a predetermined time; and
determining an average engine-out energy flow based on said accumulated weighted energy residual and said accumulated weight.

7. The method of claim 6 wherein accumulating a plurality of said weights includes calculating the sum of each system quality weight over predetermined time.

8. The method of claim 6 wherein accumulating a plurality of said weighted energy residuals includes calculating the sum of the product of each energy residual and respective system quality weight over said predetermined time.

9. A method of verifying cold start emissions reduction control in an internal combustion engine, comprising:
measuring engine speed;
determining a commanded ignition timing of said engine;
determining an actual energy flow based on said measured engine speed and said commanded ignition timing;
determining an expected energy flow based on designed engine speed and designed ignition timing calibrations;
determining an energy flow residual based on said actual energy flow and said expected energy flow;
determining a filtered average engine-out energy flow residual based on an accumulation of said energy flow residuals over a predetermined time;
comparing said filtered average engine-out energy flow residual with a predetermined acceptable range; and
generating a signal based on said comparison.

10. The method of claim 9 wherein determining an actual energy flow comprises:
determining an actual thermal energy based on said commanded ignition timing;
determining an actual thermal mass flow based on said measured engine speed; and
calculating a product of said actual thermal energy and said thermal mass flow.

11. The method of claim 9 wherein determining an expected energy flow comprises:
determining a designed thermal mass flow based on a designed engine speed;
determining a designed thermal energy potential based on designed ignition timing; and
calculating a product of said designed thermal mass flow and said designed thermal energy potential.

12. The method of claim 9 wherein determining an energy flow residual comprises:
calculating a difference between said actual energy flow and said expected energy flow.

13. The method of claim 9 wherein determining a filtered average engine-out energy flow comprises:
assigning a system quality weight to said energy flow residual based on predetermined operating conditions;
accumulating a plurality of said system quality weights over a predetermined time;
accumulating a plurality of said weighted energy residuals over a predetermined time;
determining an average engine-out energy flow based on said accumulated weighted energy residual and said accumulated system quality weight; and
filtering said average engine-out energy flow.

14. The method of claim 13 wherein accumulating a plurality of said weights includes calculating the sum of each system quality weight over a predetermined time.

15. The method of claim 13 wherein accumulating a plurality of said weighted energy residuals includes calculating the sum of the product of each energy residual and respective system quality weight over said predetermined time.

16. The method of claim 13 wherein determining an average engine-out energy flow comprises:
calculating said accumulated weighted energy residual divided by said accumulated system quality weight.

17. The method of claim 13 wherein assigning a weight comprises:
determining if a throttle position is within a predetermined range;
determining if an intake mass airflow is within a predetermined range;
determining if a vehicle speed is within a predetermined range;
determining if a coolant temperature is within a predetermined range;
determining if said engine is running within a predetermined run time; and calculating the product of all weights defining a system quality weight based on said determinations.

18. A method of verifying cold start emissions reduction control in an internal combustion engine, comprising:

measuring engine speed;

determining a commanded ignition timing of said engine;

determining an actual energy flow by:
    determining an actual thermal energy based on said commanded ignition timing;
    determining an actual thermal mass flow based on said measured engine speed; and
    calculating a product of said actual thermal energy and said thermal mass flow;

determining an expected energy flow by:
    determining a designed thermal mass flow based on a designed engine speed;
    determining a designed thermal energy potential based on designed ignition timing; and
    calculating a product of said designed thermal mass flow and said designed thermal energy potential;

determining an energy residual by:
    calculating a difference between said actual energy flow and said expected energy flow;
    assigning a weight to said energy residual based on predetermined operating conditions;
    accumulating a plurality of said weighted energy residuals over a predetermined time;
    accumulating a plurality of said weights over a predetermined time;
    determining an average engine-out energy flow based on said accumulated weighted energy residual and said accumulated weight;

filtering said average engine-out energy flow; and comparing said filtered average engine-out energy flow with a predetermined acceptable range; and generating a signal based on said comparison.

* * * * *